United States Patent [19]

Chang et al.

[11] Patent Number: 5,252,161

[45] Date of Patent: Oct. 12, 1993

[54] SOFT GUSSET, HARD-PANELED LUGGAGE AND METHOD OF MANUFACTURE

[76] Inventors: S. J. Chang, 13-3, Sanjung Dong Joon-Ku Burchun City, Kyunggi-Do, Rep. of Korea; Joseph J. Berman, 55 Mountain View Ter., Hillsdale, N.J. 07642

[21] Appl. No.: 950,575

[22] Filed: Sep. 23, 1992

Related U.S. Application Data

[63] Continuation-in-part of Ser. No. 764,794, Sep. 24, 1991, which is a continuation-in-part of Ser. No. 702,950, May 20, 1991, abandoned.

[30] Foreign Application Priority Data

May 5, 1991 [KR] Rep. of Korea .................. 91 7382

[51] Int. Cl.$^5$ .................................................. B29C 43/00
[52] U.S. Cl. .................................... 156/196; 156/213; 156/228; 156/245; 156/267; 190/100; 190/103; 190/124; 190/125; 190/127
[58] Field of Search ............... 156/196, 213, 228, 245, 156/267; 264/250, 251, 257, 258, 263; 190/18 A, 100, 103, 124, 125, 127

[56] References Cited

U.S. PATENT DOCUMENTS

| | | |
|---|---|---|
| 21,384 | 8/1858 | Timby . |
| 249,092 | 10/1881 | Protzen . |
| 1,045,390 | 10/1912 | Goldsmith . |
| 1,171,678 | 2/1916 | Trotter . |
| 1,712,448 | 5/1929 | Eckhard . |
| 1,889,765 | 12/1932 | Switkes . |
| 2,002,878 | 5/1935 | Belber ................................. 190/44 |
| 2,536,169 | 1/1951 | Gray ................................. 150/1.6 |
| 2,539,051 | 1/1951 | Bendenfeld ........................ 150/1.6 |
| 2,621,139 | 10/1952 | Messing ............................. 154/106 |
| 2,705,690 | 4/1955 | Nelson ............................... 117/138.8 |
| 2,723,962 | 10/1955 | Hodges ............................... 260/22 |
| 2,907,420 | 9/1959 | Doppett .............................. 190/51 |
| 3,061,057 | 9/1962 | Miller ................................. 190/44 |
| 3,321,053 | 5/1967 | Doppett .............................. 190/45 |
| 3,334,001 | 8/1967 | Tyhurst ............................... 156/228 |
| 3,335,827 | 8/1967 | Hofferbert .......................... 190/127 |
| 3,443,671 | 5/1969 | Dyke ................................... 190/43 |
| 3,544,418 | 12/1970 | Holtzman ........................... 190/125 |
| 3,660,218 | 5/1972 | Shepherd et al. .................. 161/87 |
| 4,061,817 | 12/1977 | Maxel .................................. 156/245 |
| 4,128,150 | 12/1978 | Popkin et al. ...................... 190/44 |
| 4,437,549 | 3/1984 | Gibbs .................................. 190/109 |
| 4,544,051 | 10/1985 | Saltz ................................... 190/127 |
| 4,589,530 | 5/1986 | Sher .................................... 190/18 A |
| 4,773,515 | 12/1988 | Kotkins, Jr. ........................ 190/103 |
| 4,784,248 | 10/1988 | Workman ........................... 190/126 |
| 4,894,280 | 1/1990 | Guthrie .............................. 428/224 |
| 4,953,673 | 12/1990 | Ambasz .............................. 190/103 |
| 5,004,091 | 4/1991 | Natho et al. ....................... 190/125 |
| 5,065,847 | 11/1991 | Hsieh .................................. 190/125 |
| 5,105,919 | 5/1992 | Bones et al. ....................... 190/18 A |
| 5,105,920 | 4/1992 | Grebenstein ....................... 190/18 A |
| 5,132,166 | 7/1992 | Adams et al. ...................... 428/212 |

FOREIGN PATENT DOCUMENTS

| | | |
|---|---|---|
| 2026 | of 1926 | Australia . |
| 20989 | 2/1883 | Fed. Rep. of Germany . |
| 285016 | 12/1990 | Fed. Rep. of Germany ...... 190/125 |
| 725576 | 5/1932 | France . |
| 1557297 | 2/1969 | France . |
| 8113192 | 6/1981 | France . |
| 2508288 | 12/1982 | France ............................... 190/125 |
| 9206838 | 4/1992 | PCT Int'l Appl. ................. 190/125 |
| 18192 | of 1892 | United Kingdom . |
| 158755 | 2/1921 | United Kingdom . |
| 225610 | 12/1924 | United Kingdom . |
| 261923 | 12/1926 | United Kingdom . |
| 588568 | 5/1947 | United Kingdom . |
| 2173393 | 10/1986 | United Kingdom . |
| 2245250 | 2/1992 | United Kingdom . |

*Primary Examiner*—Caleb Weston
*Attorney, Agent, or Firm*—Weingram & Zall

[57] ABSTRACT

A formed panel for a bag and method of manufacturing therefore is provided which allows the bag to maintain an original shape without deformation even though the bag may be acted on by external forces, and also allows the bag to appear soft from the outside thereof. The panel is formed from the impression of a fabric material onto a rigid plastic material. Also provided is a hard-sided, soft-gusseted luggage to protect the contents of the luggage without a totally rigid construction. A method of manufacturing is provided a hard panel for luggage which includes impressing a fabric sheet onto a plastic sheet to form a combined sheet and molding the combined sheet to the desired shape. In another embodiment, a formed panel is made from an outer fabric, a substrate and an inner fabric, all of which are separately formed and then adhered together.

11 Claims, 13 Drawing Sheets

SOFT GUSSET, HARD-PANELED LUGGAGE AND METHOD OF MANUFACTURE

RELATED APPLICATIONS

This application is a continuation-in-part application of pending U.S. application Ser. No. 07/764,794, filed Sep. 24, 1991, which is a continuation-in-part application of U.S. application Ser. No. 07/702,950, filed May 20, 1991, now abandoned.

BACKGROUND OF THE INVENTION

1. Field of the Invention

The present invention relates to a formed panel for a bag and method of manufacturing therefore, and more particularly, to a formed panel for a bag and method of manufacturing therefore which allows the bag to maintain an original shape without deformation even though the bag may be acted on by external forces, and also allows the bag to appear soft from the outside thereof.

This invention also relates to luggage, and more particularly hard-sided, soft gusset luggage having durability and sufficient stiffness to protect the contents of the luggage without a totally rigid construction.

2. Description of Related Art

In general, when a bag is manufactured with the use of a panel formed by extruding Acrylic Buterate Styrene (ABS), Poly Vinyl Chloride (PVC), Poly Ethylene (PE), Poly Propylene (PP) and pack, the bag is able to maintain an original shape without deformation by external force. Also, when a bag is made of material such as leather, vinyl, fabric or the like, it is easily deformable by external force.

According to the former case, it is possible to maintain the original shape of the bag, even if the bag is pressed by external forces. This results in the advantage that the contents of the bag can be maintained in their proper shape. Accordingly, this type of bag is generally used as a traveling bag, a bag for instruments, etc. Since the material of the formed panel is generally a hard plastic such a ABS, PVC, PE, PP, pack and so on, though the bag can be maintained in its original shape, it is a disadvantage that the outward appearance of the bag is unpleasant to the touch.

In the other case, where materials such as leather, vinyl, fabric or the like are used for manufacturing the bag, the outward appearance of the bag is agreeable to the touch, but when external force is applied to the flexible material, the force is directly transferred to the contents of the bag.

In order to overcome the disadvantage of the later case, it has been suggested that a structure with a square frame be inserted into the body of the bag to maintain a shape of the bag. While this structure maintains, partly, a square shape, it is incapable of maintaining the contents in the bag in their original form.

Soft-sided luggage has many advantages but also provides many problems which are inherent in its structure. Soft-sided luggage, normally referred to as luggage having a hard gusset or midsection and soft panels in front and back, must be filled full in order for the contents of the luggage and the front and back panels to be protected. If the luggage is not filled, voids occur which leave the soft front and back panels vulnerable to puncture or ripping. While such luggage is light in weight, it is bulky because of the stiffness and volume of the gusset. Additionally, the structure of soft-sided luggage requires rigid frames for closing the front panel to the gusset, which frames tend to bend because of the lack of strength of the front panel, leading to the bags often being bent and deformed.

Appearance problems also exist if the luggage is not carefully manufactured. If a hard gusset is used in the center section, then the hard section must be covered with the same soft material that is used to form the panels. If, on the other hand, the luggage is to have hard panels all around, then very often the panels are made of plastic and the entire luggage tends to appear cheap and shoddy. If cloth is used in the luggage, then the luggage will have a soft appearance and will in fact be soft in the front and back panels and require separate structural stiffeners.

Additionally, flexible or soft-sided luggage is not necessarily expandable even though the sides are soft. Since the luggage must be relatively full in order to keep the sides from becoming vulnerable to puncture or ripping, it is necessary that the soft-sided luggage be very accurately sized to the load involved. Attempts have been made in the past to expand the luggage in accordance with the size of the load being carried but these attempts have been less than successful. Furthermore, none of these patents, taken either singly or in combination, are thought to provide the benefits of the present invention.

Trotter, U.S. Pat. No. 1,171,678, shows a rigid piece of luggage having an expandable side panel by placing flexible sheet within the remainder of the luggage and strapping the two together.

Switkes, U.S. Pat. No. 1,889,765, shows a bellows expansion panel for the outside of an attache case.

Gray, U.S. Pat. No. 2,536,169, shows a device having two zippered halves connected by a zipper, so that the middle of the apparatus is flexible while the outer panels are relatively stiff. Provisions are made for inserting zip and expansion panels into the device to make the device of larger capacity.

Miller, U.S. Pat. No. 3,061,057, is a device which has add on segments zipped together to a soft, flexible center.

Dyke, U.S. Pat. No. 3,443,671, shows an expansible carrying case having asyxmetrically opening zippered pleats to enable expansion.

Kotkins, Jr., U.S. Pat. No. 4,773,515, shows a device having zip on expansion chambers at the ends of the device.

The related art does not provide the essential elements or benefits of the present invention.

SUMMARY OF THE INVENTION

In order to overcome the problems of the prior patents, the present invention sets forth a light weight soft luggage having hard protective panels on the front and back sides which are attached to a fabric gusset section. The flexibility of the fabric in the gusset section allow for the hard front and back panels to orient themselves with respect to the loading of the contents in the luggage and allows for collapsing of the luggage when empty and enables expansion of the luggage when necessary.

Additionally the present invention sets forth a method of manufacturing luggage in which hard front and back panels are formed by molding plastic and a cloth cover to form the external surface of the panel. The rear panel is then sewn to a cloth gusset section using standard welting technology. The front panel has a hinge section sewn to it and the front of the gusset section and has a mating zipper sewn to the remaining edges of the front panel and the front portion of the gusset. A metal stiffening band is mounted in the gusset and the luggage handle is fastened through the gusset to the stiffening band.

According to an embodiment of the present invention, raw material is adhesively deposited on a resin panel and the resultant composition is heated for 30 to 50 seconds at 120° C. to 140° C. After the heating process has been completed, the resultant composition is extruded and formed by using a metal molding press, the formed product is cooled and then the scrap is removed from the formed product to obtain the formed panel.

In forming of the formed panel according to another embodiment of the present invention, raw material such as fabric, vinyl or the like is adhesively deposited on a resin panel which is extracted from an injection molding machine and the resultant structure is extruded so that the raw material can be deposited on the resin panel. After that, a cooling and carrying process is performed on the resultant structure and the resultant formed product is cut to predetermined lengths through a cutting process.

According to the first embodiment of the method as described above, when leather or patterned fabric is used as a raw material, it will be apparent that an advantage that is provided is that a worker can directly align the patterns on fabrics or the connecting parts of leather.

Further, in case of the second embodiment of the method as described above, since the raw material is directly deposited on the resin panel and then the extruding process performed, mass production may be achieved.

In another embodiment of the present invention, lengths of fabric material and a substrate are cut to size, formed, and then pressed together. The laminate construction is held together by means of an adhesive between the layers of fabric and the substrate. By forming the shape of the components of the panel prior to adhering the components together, wrinkling and stretching of the fabric material is reduced. Additionally, a spring loaded frame may be used to further reduce such wrinkling.

Accordingly, it is an object of the present invention to provide a luggage constructed with a flexible gusset section and relatively rigid front and back panels, which piece of luggage is light in weight.

It is an object of the present invention to provide a formed panel for a bag and method of manufacturing therefore in which a raw material such as fabric, leather, vinyl or the like is adhesively deposited on a resin panel which is extruded to form a basic panel for a bag, so that the bag provides a soft feel in its outward appearance, while not permitting deformation even though external forces are applied.

It is also an object of the present invention to provide a luggage constructed with a flexible gusset section and relatively rigid front and back panels, which piece of luggage is durable.

It is another object of the present invention to provide a luggage constructed with a flexible gusset section and relatively rigid front and back panels, which piece of luggage is strong.

It is even another object of the present invention to provide a luggage constructed with a flexible gusset section and relatively rigid front and back panels, which piece of luggage is inexpensive to fabricate.

Even another object of the present invention to provide a luggage constructed with a flexible gusset section and relatively rigid front and back panels, which piece of luggage is expandable beyond its normal size when full.

Yet another object of the present invention to provide a luggage constructed with a flexible gusset section and relatively rigid front and back panels, which piece of luggage is collapsible when empty.

Still another object of the present invention to provide a luggage constructed with a flexible gusset section and relatively rigid front and back panels, which piece of luggage is flexible.

A further object of the present invention to provide a luggage constructed with a flexible gusset section and relatively rigid front and back panels, which piece of luggage has few complex parts and is of simplified construction.

Even a further object of the present invention to provide a luggage constructed with a flexible gusset section and relatively rigid front and back panels, which piece of luggage has a simplified construction that allows for simplified assembly.

An additional object of the present invention to provide a luggage constructed with a flexible gusset section and relatively rigid front and back panels, which piece of luggage allows for the components thereof to be sewn to form the entire luggage and which allows for the luggage to be opened and closed by means of a zipper.

Another object of the present invention to provide a luggage constructed with a flexible gusset section and relatively rigid front and back panels, which piece of luggage has a zipper closure with hard side advantages.

Even another object of the present invention to provide a luggage constructed with a flexible gusset section and relatively rigid front and back panels, which piece of luggage is impervious to the crushing of the contents or the puncture or ripping of the front and back panels.

Yet another object of the present invention to provide a luggage constructed with a flexible gusset section and relatively rigid front and back panels, which piece of luggage has a strong handle.

Still another object of the present invention to provide a luggage constructed with a flexible gusset section and relatively rigid front and back panels, which piece of luggage which is hard sided with the major components thereof sewn together.

It is also an object of the present invention to provide a luggage constructed with a flexible gusset section and relatively rigid front and back panels, which piece of luggage is cloth covered and has rigid front panels and back panels, and a flexible central section.

Additionally it is an object of the present invention to provide a luggage constructed with a flexible gusset section and relatively rigid front and back panels, which piece of luggage does not require external or internal stiffening sections for the front and rear panels.

It is also is an object of the present invention to provide a method for manufacturing and assembling an article of luggage having rigid front and back panels with a simplified method of construction.

It is another object of the present invention to provide a method for manufacturing and assembling an article of luggage which molds cloth to plastic to form hard front and back panels that have cloth surfaces for durability and an attractive appearance.

It is still another object of the present invention to provide a method for manufacturing and assembling an article of luggage which allows for the sewing together of the major components.

It is yet another object of the present invention to provide a method for manufacturing and assembling an article of luggage which allows for zipper closure thereof.

It is a further object of the present invention to provide a method for manufacturing and assembling an article of luggage which is sequenced for ease of assembly.

It is even a further object of the present invention to provide a method for manufacturing and assembling an article of luggage which is sequenced for inexpensiveness in the cost of assembly.

It is still a further object of the present invention to provide a method for manufacturing and assembling an article of luggage which does not require precision parts for the assembly thereof.

It is yet another object of the present invention to provide a method for manufacturing a panel for an article of luggage wherein the panel has an outer fabric and which method reduces wrinkling of the outer fabric.

These, as well as further objects and advantages of this invention will become apparent to those skilled in the art from a review of the accompanying Detailed Description of the Preferred Embodiments, reference being made to the accompanying drawings.

DESCRIPTION OF THE PREFERRED EMBODIMENTS

The preferred embodiments of the present invention will be now described with reference to the accompanying drawings.

First Embodiment

Figure 1:
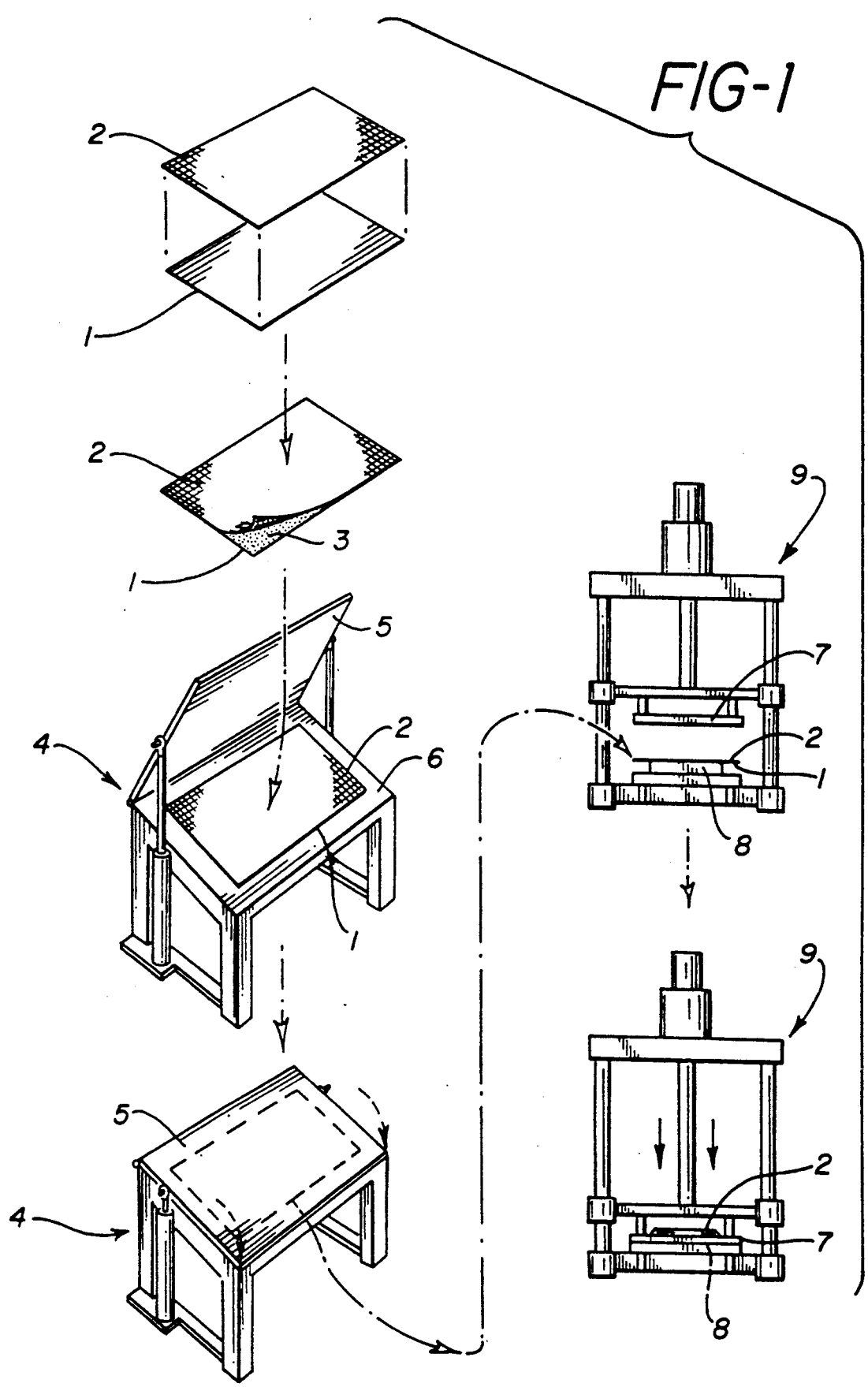
FIG. 1 is a view illustrating a processing sequence of a first embodiment according to the present invention.
Figure 2:
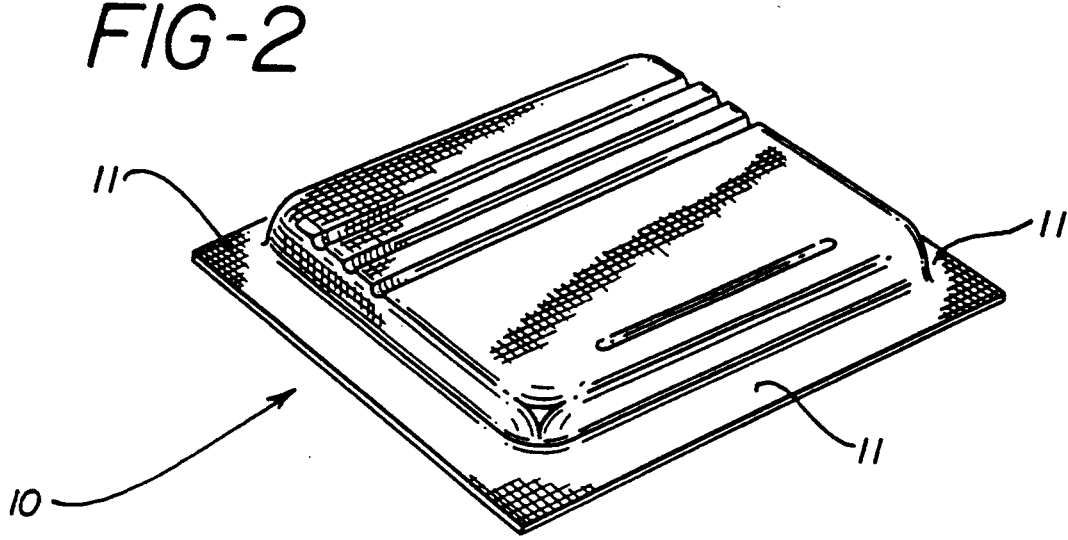
FIG. 2 is a perspective view of a formed product according to the present invention.

Referring to FIG. 1, a resin panel 1 is preferably made of a material such as Acrylic Buterate Styrene (ABS), Poly Ethylene (PE), Poly Propylene (PP) and pack, which are hard and partly contained components of rubber. A flexible material, such as fabric, leather, vinyl or the like, is used as a raw material to be deposited on the resin panel.

In this embodiment, an adhesive agent 3 is coated on the resin panel 1, the panel 1 is cut to a predetermined size and the raw material 2 is then adhesively deposited on the resin panel 1.

Next, the resin panel and raw material 2 composition, is loaded into press 4, on the upper side of a heating plate of press 4 and then the resin panel 1 is pressed by a pressing plate 5. During this operation, the temperature of the pressing plate 5 and the upper side 6 of the heating plate and press 4 are all preferably between 120° C. and 140° C. and the pressing time is approximately 30 to 50 seconds.

Next, the heat-processed resin panel 1 is formed by the molding press 9, typically a plug-molding press. The molding press 9 includes an upper metal molder 7 and a lower metal molder 8. Preferably, the upper and lower molders 7 and 8 are replaceable and are shaped as male and female components to correspond to the shape of the panel for the bag to be formed.

Accordingly, the flexible resin panel 1, with the raw material 2 adhered thereto, is passed through the heating plate and press 4, is loaded on the lower metal molder 8 of the molding press 9 and then the resin panel 1 is extruded and formed by applying the upper metal molder 7, thereto.

Figure 3:
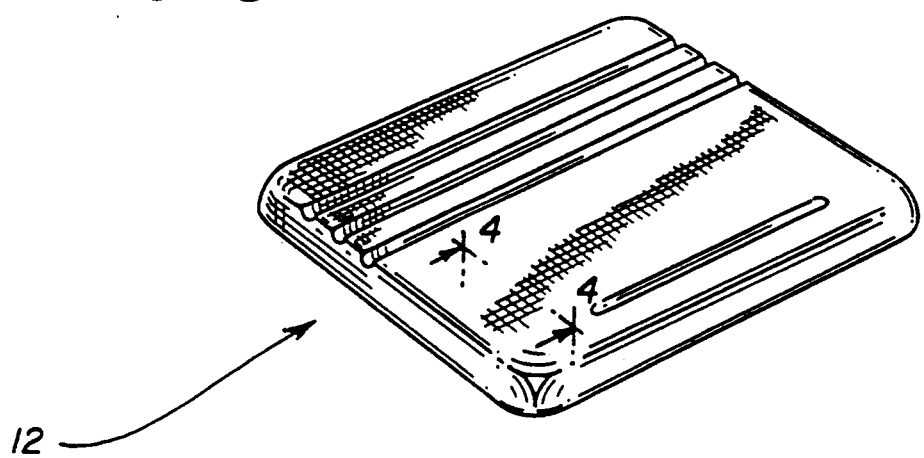
FIG. 3 is a perspective view of a formed panel with the scrap cut away from the product of the present invention.

The resultant formed product 10 is cooled by a cooling apparatus, not shown, and the scrap 11 about the periphery of the resin panel 1 is cut off to thereby obtain the formed panel 12 as shown in FIG. 3.

Figure 4:
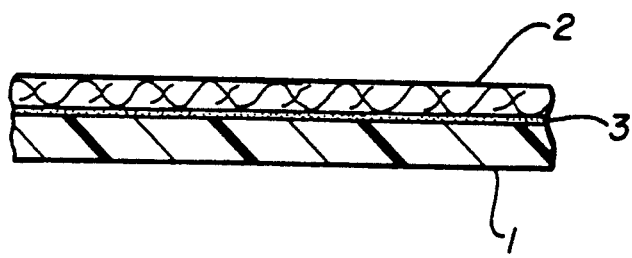
FIG. 4 is an enlarged, vertical, cross-sectional view of a formed panel of the present invention as taken along line 4—4 of FIG. 3.

The formed panel 12 is, by means of the extruding and forming process, as shown in FIG. 4, integrally coated with the flexible raw material 2 such as fabric or leather, while the inner surface is coated with a hard material such as ABS, PE, PP and pack, to provide the panel with a soft feel at the outside thereof and with rigidity against external forces.

Figure 5:
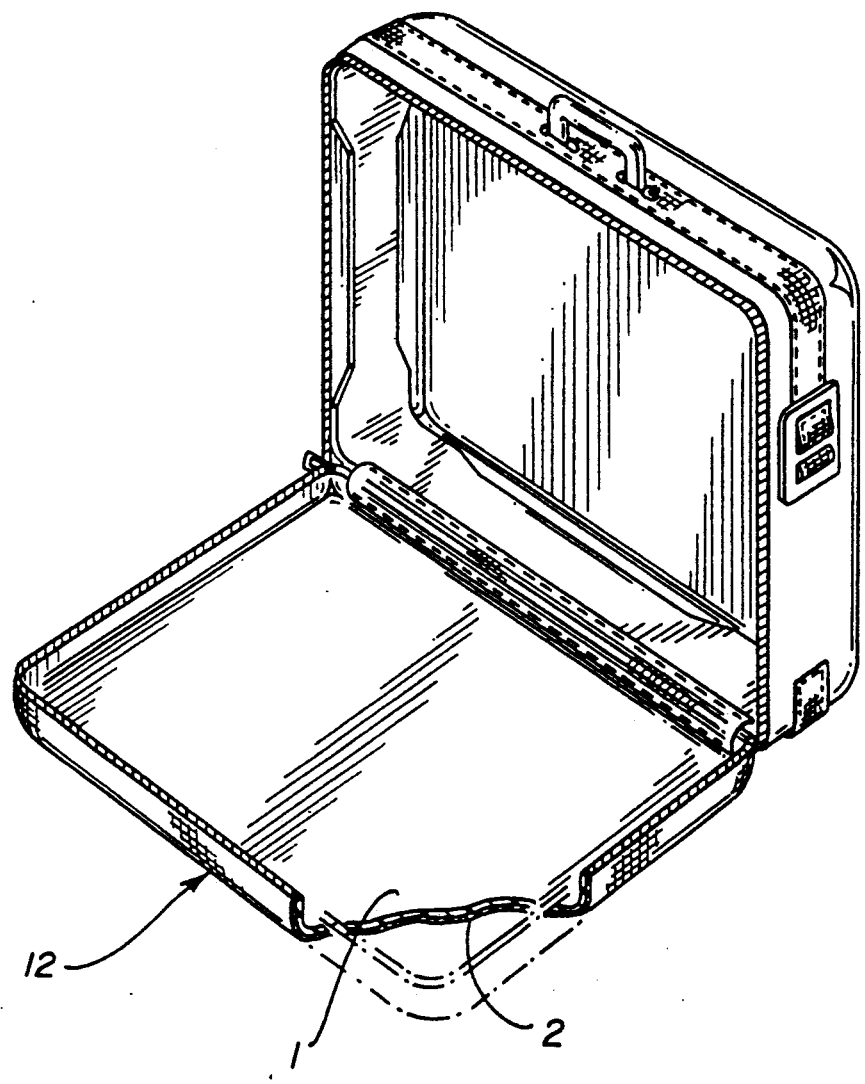
FIG. 5 is a perspective view illustrating an actual application of a formed panel according to the present invention.

Accordingly, if the panel is used for manufacturing a traveling bag, as shown in FIG. 5, additional accessories may be attached to the bag without departing from the spirit or scope of this invention, nor without relinquishing the advantages of the invention.

The present invention is not limited to a traveling bag. It will be apparent that the present invention can be adapted for use in manufacturing various kinds of bags, such as a bag for instruments, gun cases, wash implement bags, sports bags, camera bags, etc.

Second Embodiment

Figure 6:
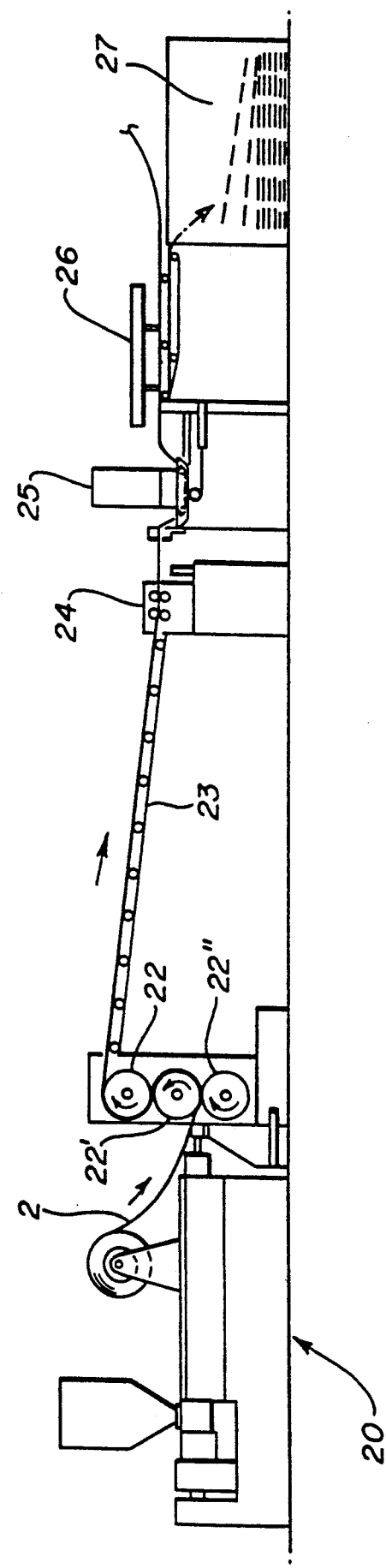
FIG. 6 is a manufacturing process view illustrating a second embodiment of the present invention.

FIG. 6 shows an alternative system in which the raw material 2 is applied and adhered to the resin panel 1 during the resin extruding process, to thereby allow mass production to be achieved.

More particularly, the first embodiment as described above can be adapted to position or align the raw material when it contains patterns which must be aligned when the raw material is leather, whereas the second embodiment allows the raw material to be sequentially adhered to the resin panel.

Referring to FIG. 6, the raw material is supplied into a hopper of the extruder 20 and a scrolled raw material is put into contact with the resin panel extruding from the extruder 20. The raw material is adhered to the resin panel by passing the two components, together, through a plurality of guide rollers 22, 22' and 22".

Next, the resultant composition is transferred through a cooling carrying conveyer 23 and a preserving unit 24 to a cutter 25, which automatically cuts the composition to predetermined lengths. The cut panels are guided by a carrying conveyer 26 to a store room 27.

According to this embodiment, a special adhesive agent is unnecessary for attaching the raw material to the resin panel 1 as shown in FIG. 4.

The panels stored in the store room 27 are cut down to the desired shape. The panels may then be used as shown in FIG. 5 as a side panel.

Alternatively, the present invention contemplates the formation of the shape of the panel by vacuum-molding the resin panel and the raw material.

As described above, this invention provides a formed panel for a bag which allows the bag to maintain its original shape and resist deformation from pressure by the application of external forces, while still feeling soft in its outward appearance. This invention has uses with many different types of bags including traveling bags, wash implement bags, camera bags, etc.

Figure 7:
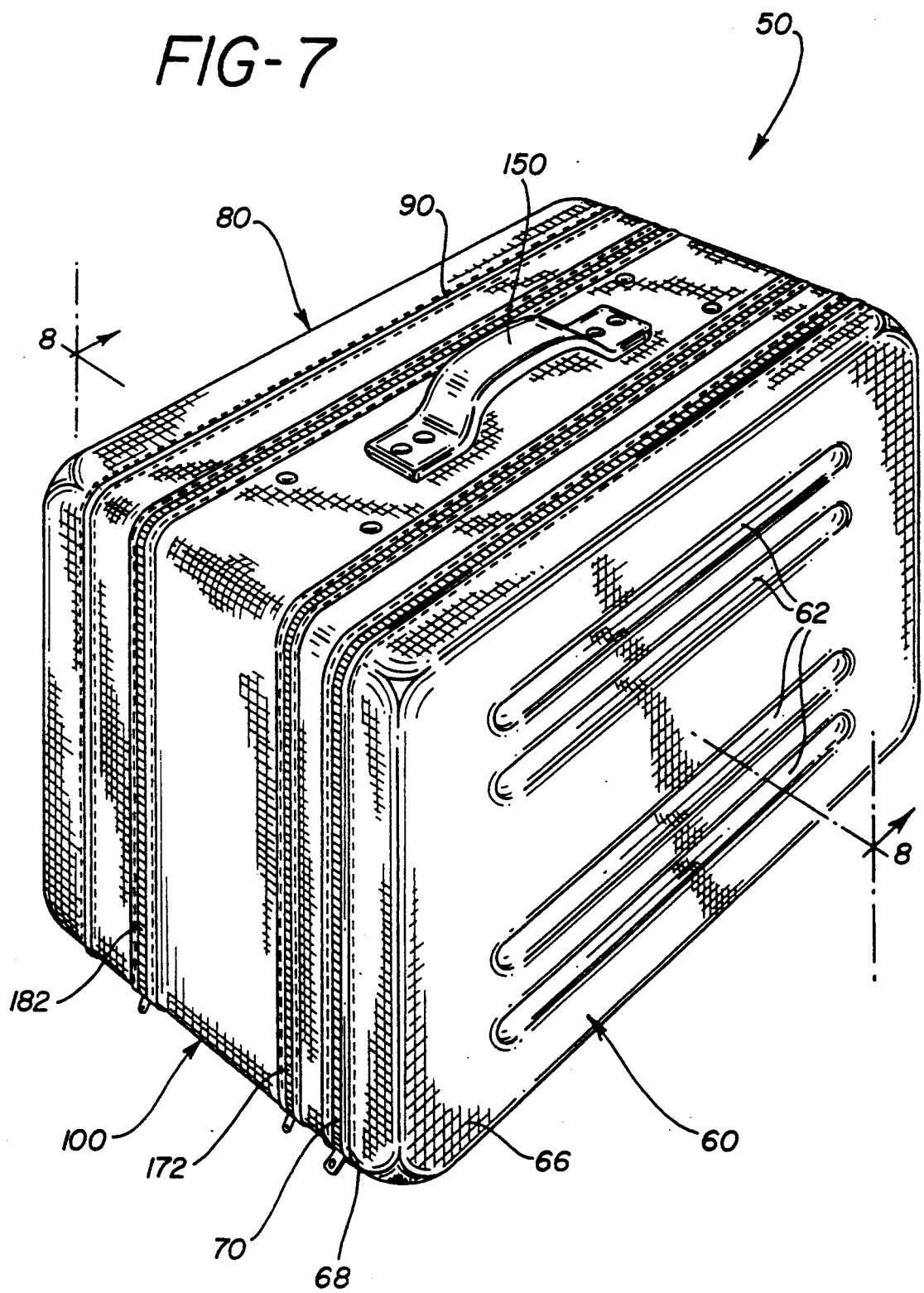
FIG. 7 is a perspective view of an embodiment of the luggage of the present invention.

Referring to FIG. 7, a piece of luggage generally indicated at 50 as shown, having a front panel generally indicated at 60 and a rear panel generally indicated at 80 connected to a central soft gusset section generally indicated at 100. The front panel has several stiffening ribs 62 molded into it to add rigidity to it. Stiffening ribs 82 are also present in the rear panel. The front panel is connected to the gusset section 100 by means of a zipper closure 70 which is used to close and open the luggage. It can be of any conventional type, as shown. It may have one or two slides depending on the choice of the designer.

The rear panel 80 is connected to the central gusset section by means of welting 90, as will be explained in greater detail hereinafter. A handle 150, is connected to the top of the luggage in a manner also to be described.

Figure 8:
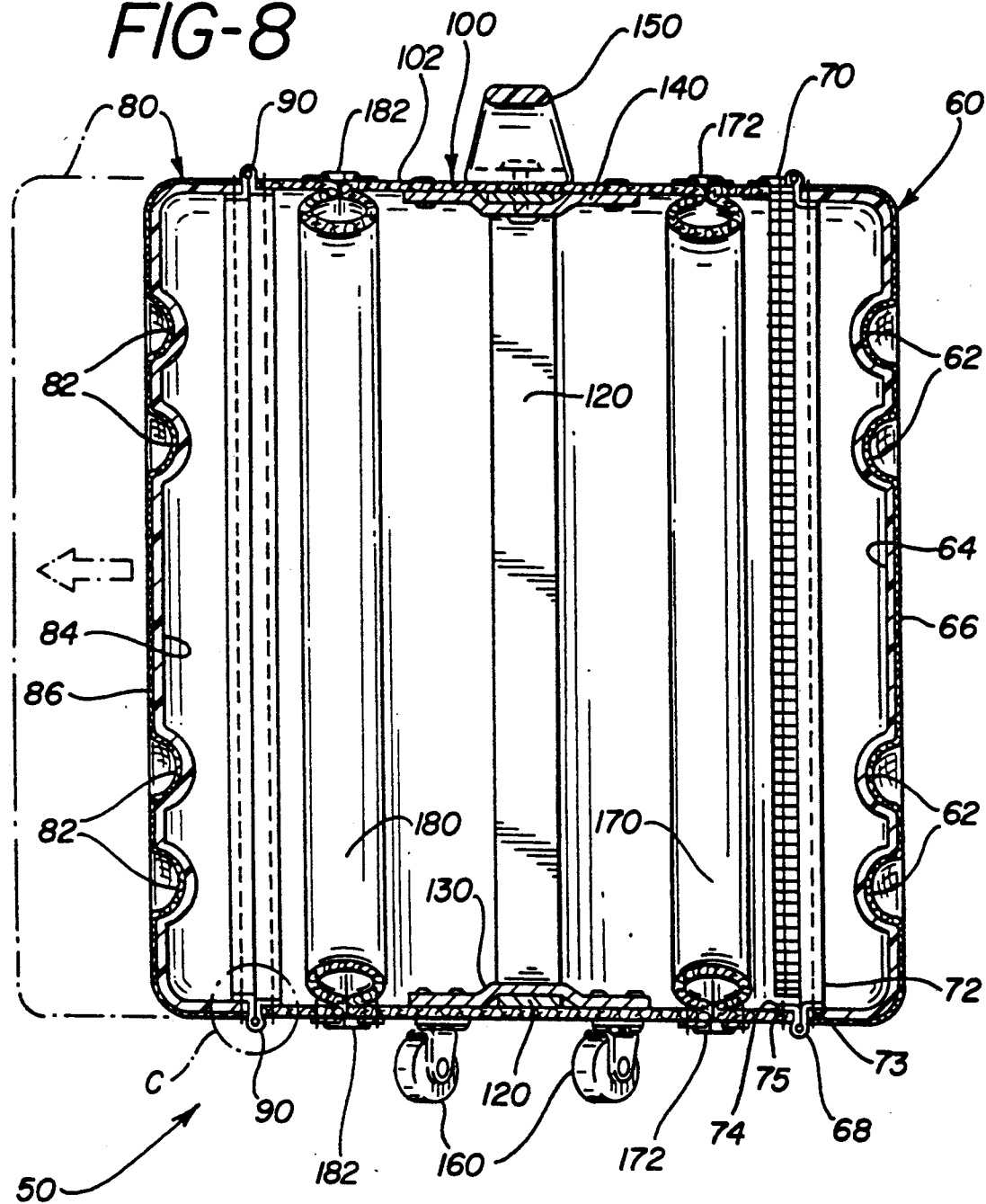
FIG. 8 is a cross-sectional view of an embodiment of the luggage of the present invention as taken along line 8—8 of FIG. 7.
Figure 9:
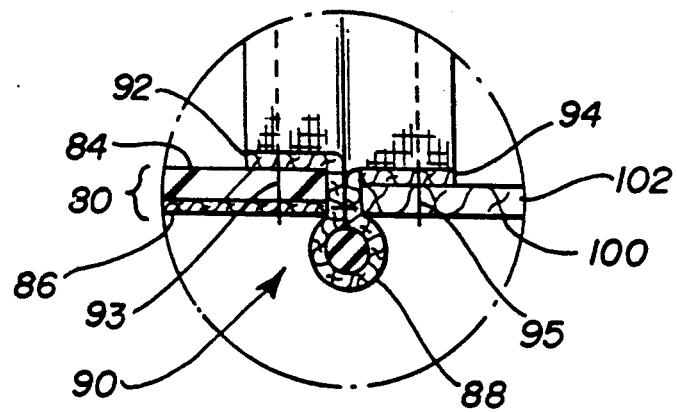
FIG. 9 is an enlarged view of Portion C of FIG. 8.

Referring to FIGS. 8 and 9, the front panel is made of an inner hard-plastic shell 64, by the method previously described and has a cloth outer surface 66. Welting 68 joins the front cover 60 to the gusset 100 by conventional means, namely with leg 72 being sewn by threads 73 to the front panel 60 and by threads 75 which sew together the gusset 100 and the other leg 74 of the welting.

The zipper 70 is sewn to the gusset 100 and to the front panel 60 in a standard conventional manner.

The rear panel 80 is of the same shape and form as the front panel 60. It has stiffening ribs 82 and includes a hard inner panel 84 with a molded cloth outer surface 86.

Welting 88 connects the rear panel 80 to the rear of the gusset section 100 in the same manner as the welting 68 connects the front panel 60 to the gusset section 100, i.e. welting 88 includes a panel leg 92 and a gusset leg 94 which are sewn to the back panel and the gusset by threads 93 and 95 respectively.

Gusset section 100 is relatively flexible and is typically made of a soft material 102 such as cloth or other durable material which allows it to flex or fold. The gusset section has a stiffening bar 120 which is a continuous metal bar that extends completely around the gusset, contacting the inside top and bottom and side surfaces of the gusset to give the gusset some shape and to act as a support for the handle 150 which is connected thereto, to support the luggage via a top plate 140 which acts to reinforce the fastening means.

A bottom plate 130 is also provided to add sufficient rigidity to the bottom of the gusset section to prevent the gusset section from collapsing. Bottom plate 130 is connected., in turn, to the stiffening bar 120.

The bottom plate can be used for the fastening wheels 160 thereto, if desired. The wheels can be attachable or detachable as desired.

As can be seen, by having a soft and flexible gusset section of the middle of the luggage, the front and back panels 60 and 80 are free to move and to basically conform the gusset section around the load contained in the luggage. The contents of the luggage will be protected by the front and back panels and application of an external force to the panels will not cause any source of stress concentration on the luggage contents, as the panels are free to move because of the flexibility of the gusset section. Therefore, any sharp impacts against the panels will be resisted by the panels and the panels will act to distribute the load among the internal contents of the luggage.

Additionally, as shown in FIG. 8, the gusset section has two expansion darts 170 and 180 respectively. Dart 170 is in the front portion of the gusset and dart 180 is in the rear portion of the gusset. The expansion darts are closed, typically, by zippers 172 and 182 respectively which are formed on the edges of the darts and which are continuous around the circumference of the gusset section. Note that the darts are disposed beyond the edges of the bottom plate 130. Opening the darts allows the gusset section to expand, if necessary, to increase the volume of the luggage. When the need for the larger luggage no longer exists, the darts can be closed to shrink the size of the luggage.

OTHER EMBODIMENTS OF THE INVENTION

Figure 10:
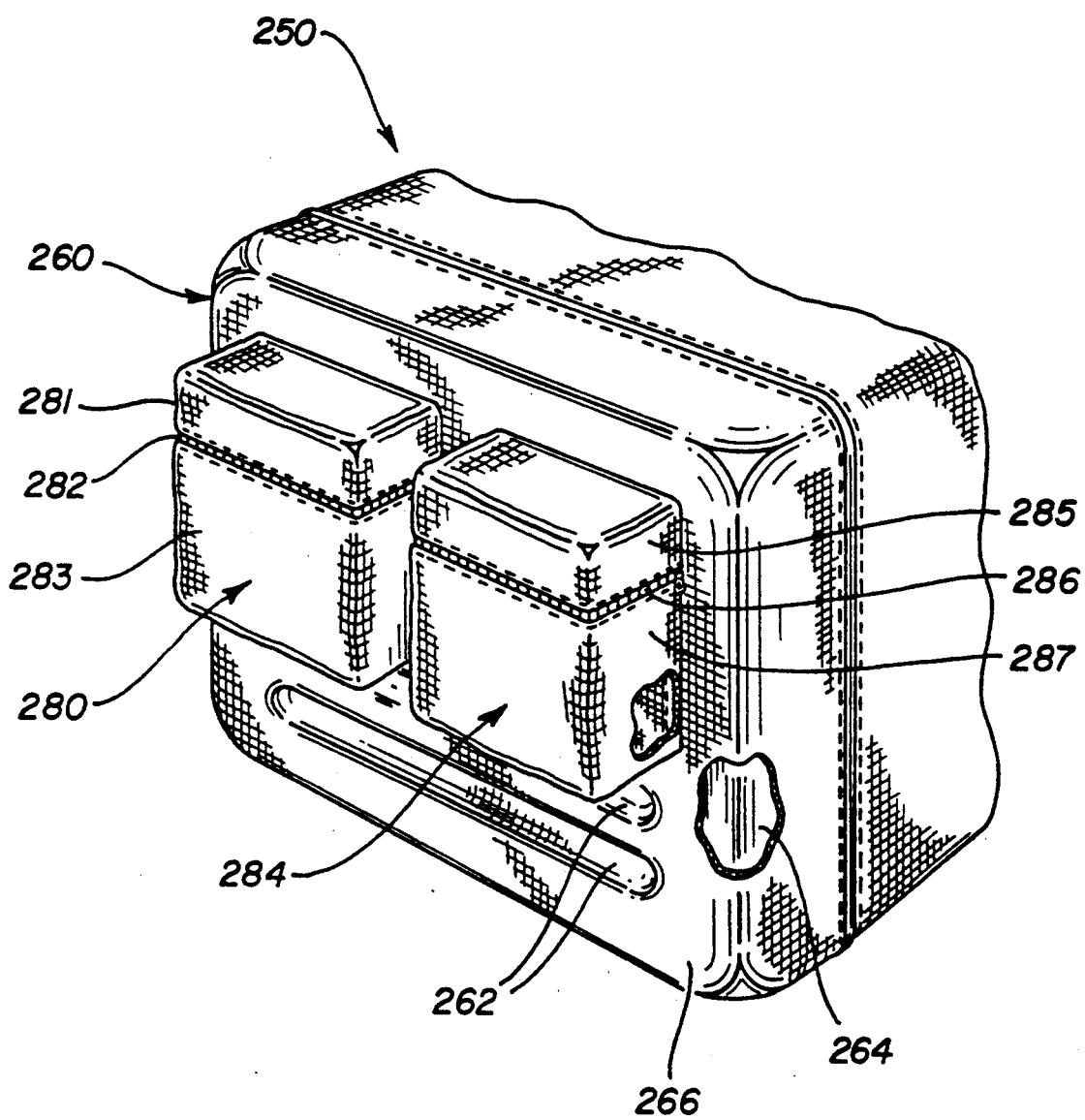
FIG. 10 is a perspective view of another embodiment of the luggage of the present invention.

In another embodiment of the invention, as shown in FIG. 10, the hard outer panels can have separate pockets sewn to them. In FIG. 10, a front panel 260 of luggage, generally indicated at 250, has stiffening ribs 262 molded thereon with the front panel 260 being formed from a hard inner panel 264 having a cloth outer covering 266 in the same manner as previously described.

In this embodiment, attached to the outer cloth panel 266 are pockets generally indicated at 280 and 284, which pockets have upper and lower sections 281 and 283 which sections are connected by a zipper 282. Pocket 284 has upper portion 285 and 287 connected by zipper 286. The pockets are formed by sewing them to the outer fabric cover 266 prior to the molding of the cover to the hard inner panel 264. The pockets could, however, be stitched directly through the hard plastic layer. Importantly, the panel is sufficiently rigid to support the pockets and maintain their shape when they are fully loaded.

Figure 11:
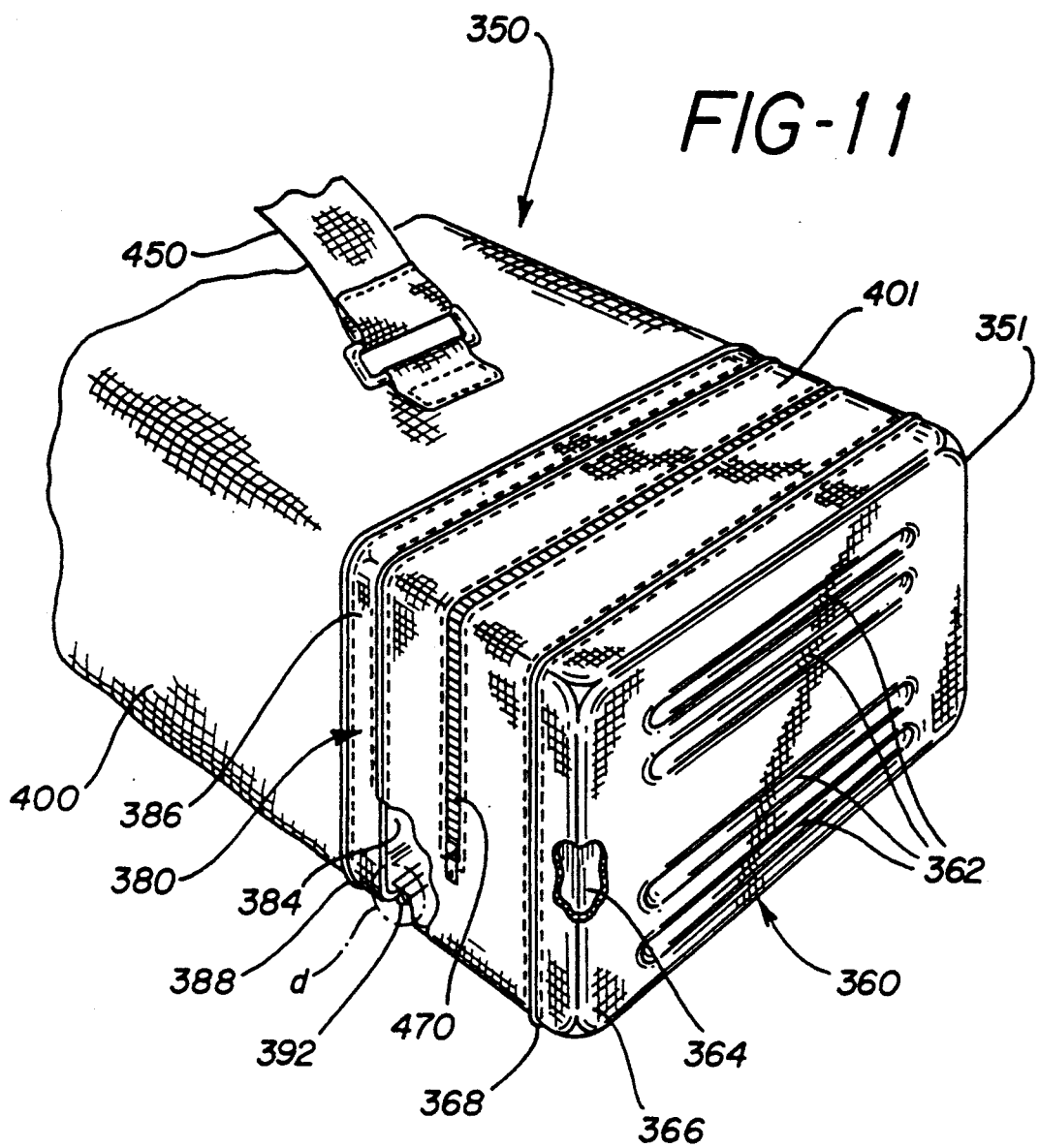
FIG. 11 is a perspective view of another embodiment of the luggage of the present invention.

FIG. 11 shows another embodiment of the invention, wherein luggage, generally indicated at 350 has a soft central section 400 with a handle 450.

The luggage has one or more hard panels constructed by the method previously described. Shown in this embodiment of the invention are two hard panels, although it should be understood that the outermost panel could be soft rather than hard. The hard panel generally indicated at 360 has stiffening ribs 362 and it is formed from a hard inner shell 364 with a cloth outer covering 366. Welting 368 connects the outer panel 360 to the soft, inner gusset-like section 401. A zipper generally indicated at 470 is used to close the outer or the extreme container generally indicated at 351.

Figure 12:
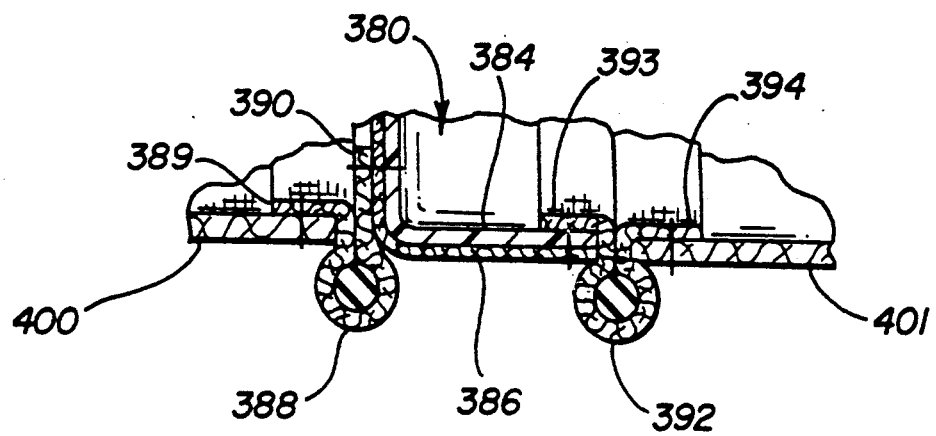
FIG. 12 is an enlarged view of Portion D of FIG. 11.

The rear panel is, preferably, also a hard panel as shown in the broken away portion D of this FIGURE. This panel is somewhat different from the rear panel of the embodiments previously described in that it is relatively flat and joined at two ends, as shown in FIG. 12, with a double row of welting in which the rear panel generally indicated at 380 includes inner hard panel 384 with the outer soft portion 386. The rear panel is connected to the bag 400 by means of welting wherein welting 388 has legs 389 and 390 which are connected to the fabric of the bag 400 and the hard panel 380, respectively, by means of stitching, and a second welting 392 that has one leg 393 connected to the hard panel 380 and the other leg 394 connected to the inner gusset-like section 401 of the end container.

The same basic principles of the luggage apply to this embodiment in that there is a soft gusset that allows for movement of the hard panels to conform around the contents of the luggage and to thereby protect the contents by distributing any externally applied load among the contents.

ADDITIONAL EMBODIMENT OF METHOD FOR FORMING PANEL

As set forth in FIGS. 13-19, the present invention includes an additional embodiment for forming a panel for a bag or luggage. The panel formed by this method has a generally rigid structure with a soft texture on the outside and inside thereof. As such, the panel may be used with a bag or luggage which allows the bag or luggage to maintain its original shape and resist deformation from pressure while providing a soft outer and inner surfaces comprising a soft fabric.

Figure 13:
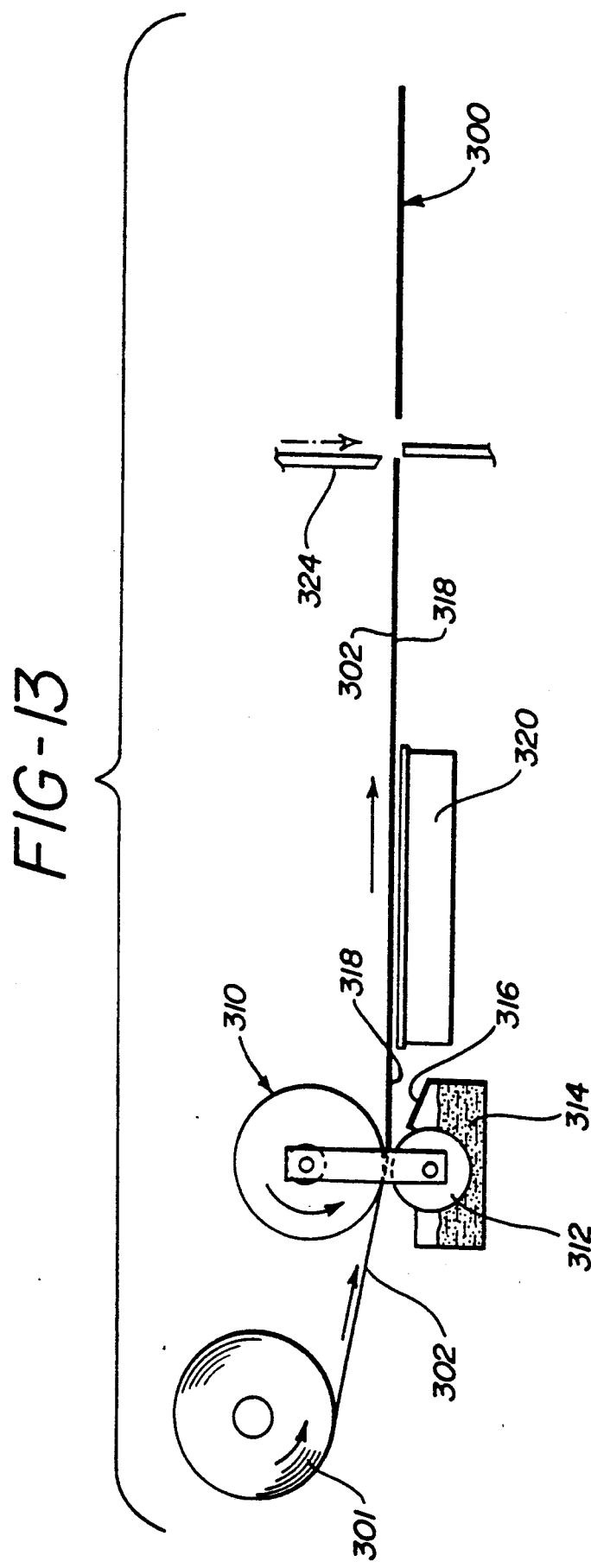
FIG. 13 is a schematic view illustrating the procedure for preparing fabric for use in connection with a third embodiment of manufacturing a formed panel of the present invention.

As shown in FIG. 13, the method of manufacturing the formed panel of this embodiment of the present invention comprises dividing a fabric to form the top side and the bottom side of the formed panel and a dividing substrate for the formed panel into sized pieces. Such sized pieces may be formed in any manner generally known in the art. One way of manufacturing the sized fabric 300 is by pulling a fabric sheet 302 from a fabric roll 301 and passing it through a pressure roller 310 and an adhesive roller 312 to apply adhesive 318 to one side of the fabric from an adhesive tank 314 via a lift-off mechanism 316. Then the fabric sheet 302 is drawn across a dryer 320 such as an oven where the adhesive is dried. Next, the fabric sheet 302 is drawn through a knife cutter 324 which cuts the fabric sheet 302 into sized fabric 300. The sized fabric 300 is the proper size for formation into a panel.

While any fabric desired may be used, typically the fabric is formed of nylon, polyester, acrylic, cotton, wool, woven polypropolene or the like. The adhesive 318 may be any adhesive that is known in the art, although it is most desirable for the formed panel of this embodiment that a contact adhesive be used. It should also be noted that pressure roller 310 is utilized for controlling the quantity of contact adhesive 318 applied to the fabric sheet 302. It should be noted that the outer and inner fabric surfaces of the formed panel are both formed in an identical procedure.

Figure 14:
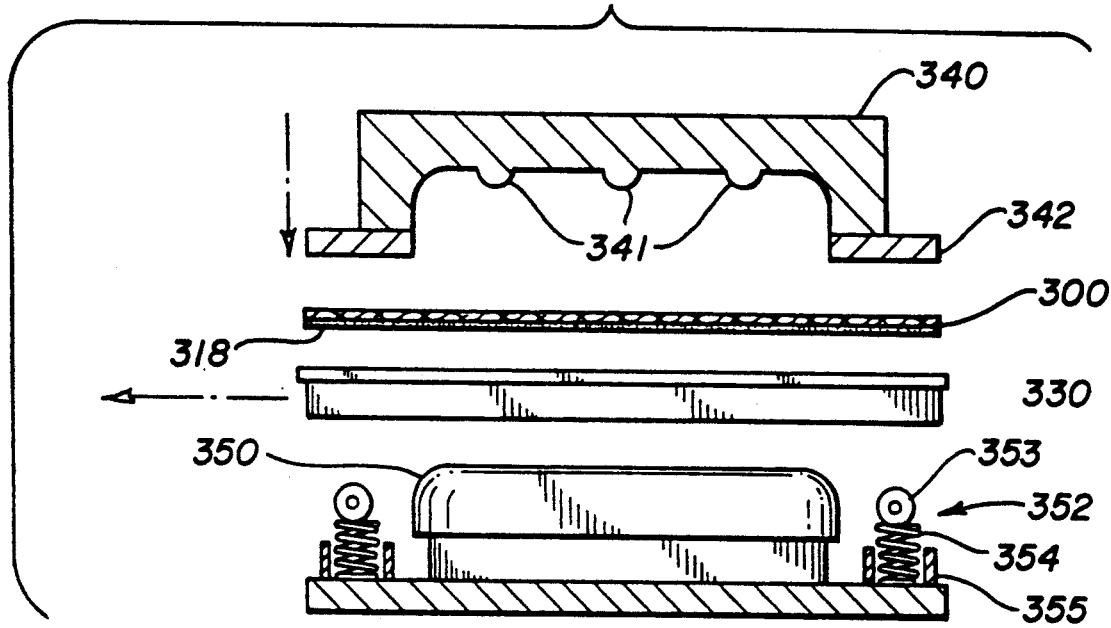
FIG. 14 is a cross-sectional view of the fabric and mold for forming the fabric for the formed panel of the present invention.

The sized fabric 300 with adhesive 318 on one side thereof is further processed in a mold shown in FIG. 14. The mold comprises a female mold 430 and a male mold 350. The sized fabric 300 is positioned between the mold components and a heater 330 is placed along the sized fabric 300 at the side with the adhesive 318 thereon. The heater 330 heats the adhesive 318 to transform the adhesive 318 from a relatively rigid substance to a relatively pliable substance. After such transition, the heater 330 is removed and the mold is closed.

The male mold 350 includes spring loaded rollers 352. Spring loaded rollers 352 help to reduce the wrinkling and/or stretching of the fabric 300 that was associated with the formed panels of the prior art. The spring loaded rollers 352 comprise a roller 353, a spring 354 and spring guides 355. Upon closing the mold, the female mold 340 and male mold 350 are brought together. The clamping surface 342 of the female mold 340 contacts the outer edge of the sized fabric 300 and pushes the ends of the sized fabric 300 against the rollers 353 of the spring guided roller 352. As closing of the mold continues, the rollers 353 roll along the bottom surface of the sized fabric 300 and move out of the path of the closing male and female molds. The resistance of the spring loaded rollers 352 is determined in part by the spring constant of the spring 354 and the spring guides 355. The spring loaded rollers permit the male and female molds 350 and 340 to be eased together to form the sized fabric 300 to its desired shape while reducing wrinkling and stretching of the sized fabric 300.

It should be noted that the female mold 340 may have ridges 341 which would correspond to similar ridges in female mold 340 so that the sized fabric 300 would be formed to its desired shape with ridges therein to provide strength and/or decoration to the final formed panel product. Similarly, the male mold 350 could contain such ridges with corresponding recesses in the female mold so that the sized fabric 300 was formed with ridges extending outward therefrom.

Upon forming the sized fabric to its desired shape, any scrap material is cut from the edges of the outer formed fabric 304. Typically, such cutting would be done with a die cutter. It should also be noted that after being formed, the adhesive 318 on the outer formed fabric 304 cools and rehardens such that the outer formed fabric 304 becomes relatively rigid.

Figure 16:
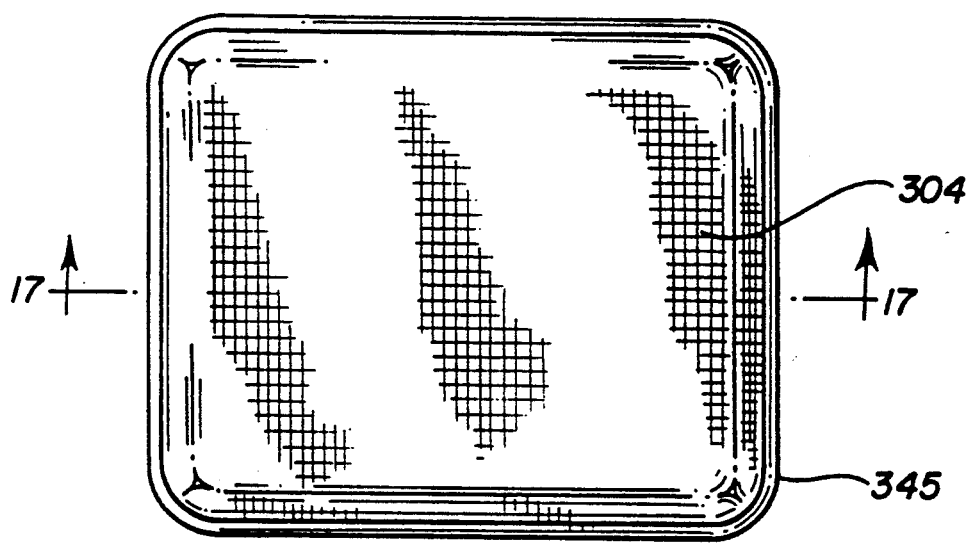
FIG. 16 shows the welting attached to the outer formed fabric for the panel of the present invention.
Figure 17:
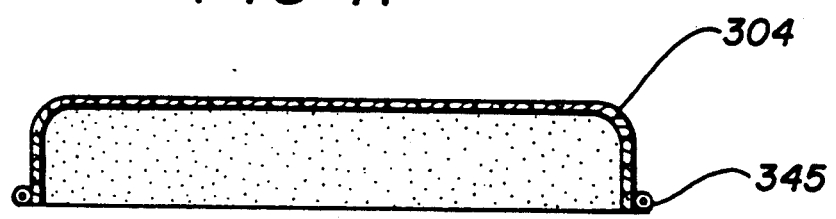
FIG. 17 is a cross-sectional view of the outer formed fabric of the panel shown in FIG. 16 taken along line 17—17.

Next, as shown in FIGS. 16 and 17, a welting 345 is attached to the outer formed fabric 304 as discussed herein with respect to the construction of the luggage.

The welting 345 provides a means for attachment of the final product to the gusset of the luggage. The welting is typically comprised of a wire core surrounded by a PVC shell. The welting 345 may be attached to the outer formed fabric 304 by sewing, heat welding, or any other method known in the art.

Figure 15:
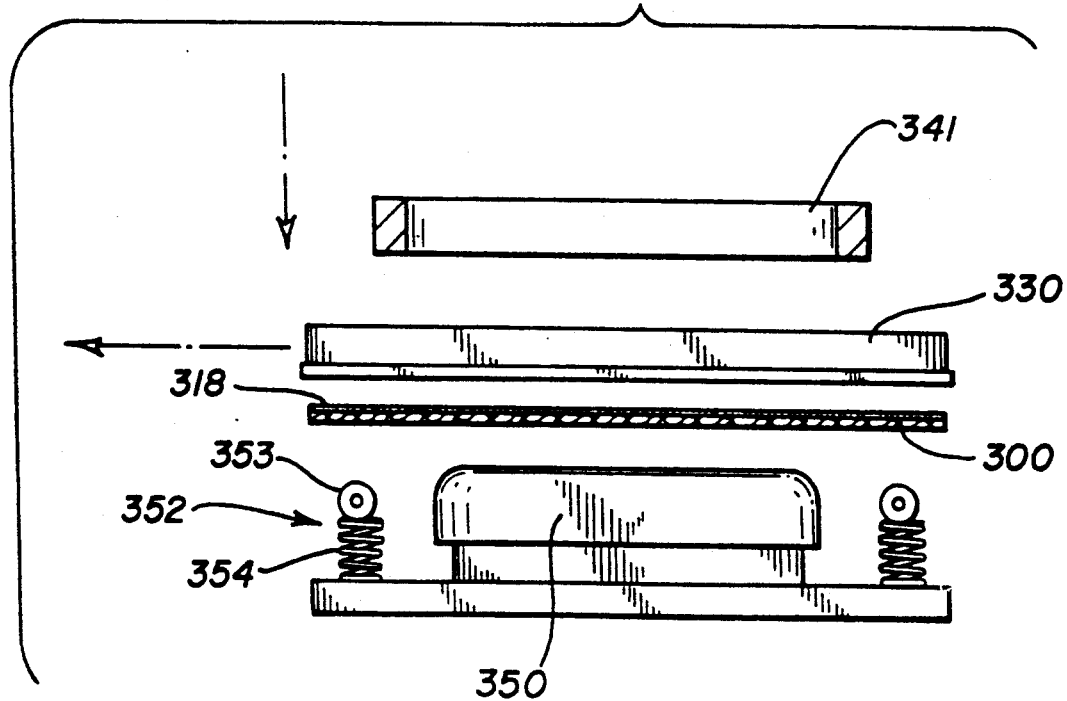
FIG. 15 shows the cross-sectional view of the fabric and mold for forming the second fabric for the formed panel of the present invention.

The inner fabric material comprising the inside of the formed panel is made in a similar way to the outer formed fabric 304. The sized fabric 300 is prepared in the same way for the inner and outer portions of the formed panel. However, as shown in FIG. 15, the sized fabric 300 is positioned within a mold having a female component 341 and a male component such that the side of the sized fabric 300 having glue 318 is facing away from the male mold 350. Like the step of forming the outer form fabric 304, a heater 330 is positioned in proximity to the side of the fabric 300 having glue 318 to heat the adhesive 318 to change the sized fabric 300 from a relatively rigid construction to a relatively pliable construction. After the sized fabric 300 becomes pliable, the heater 330 is removed and the female mold 341 and male mold 350 are closed to form the sized fabric. As the mold closes, spring loaded rollers 352 comprising a roller 353 and a spring 354 contact the lower surface of sized fabric 300 and roll along the bottom surface as the female mold and the male mold close. The spring loaded rollers 352 allow for the male and female mold to be eased together and for the sized fabric to wrap about the male mold to reduce stretching an wrinkling of the sized fabric 300 as it is formed into inner formed fabric 306.

As shown in FIG. 14, the female mold 341 is of an open frame construction to reduce interference between the adhesive 318 and a mold surface. It should also be noted that the inner formed fabric 306 could be formed to contain ridges and/or could contain extended notches to provide for dividers within the luggage. By separately forming of the components of the final formed panel product, the inner formed fabric 306 may be of a different configuration than the outer formed fabric 304 or the substrate 305. Any such dividers formed and the inner formed fabric shell 306 could be loaded with a rigid substance such as plywood, hardboard, foam or plastic to provide structural support for the divider.

Figure 18:
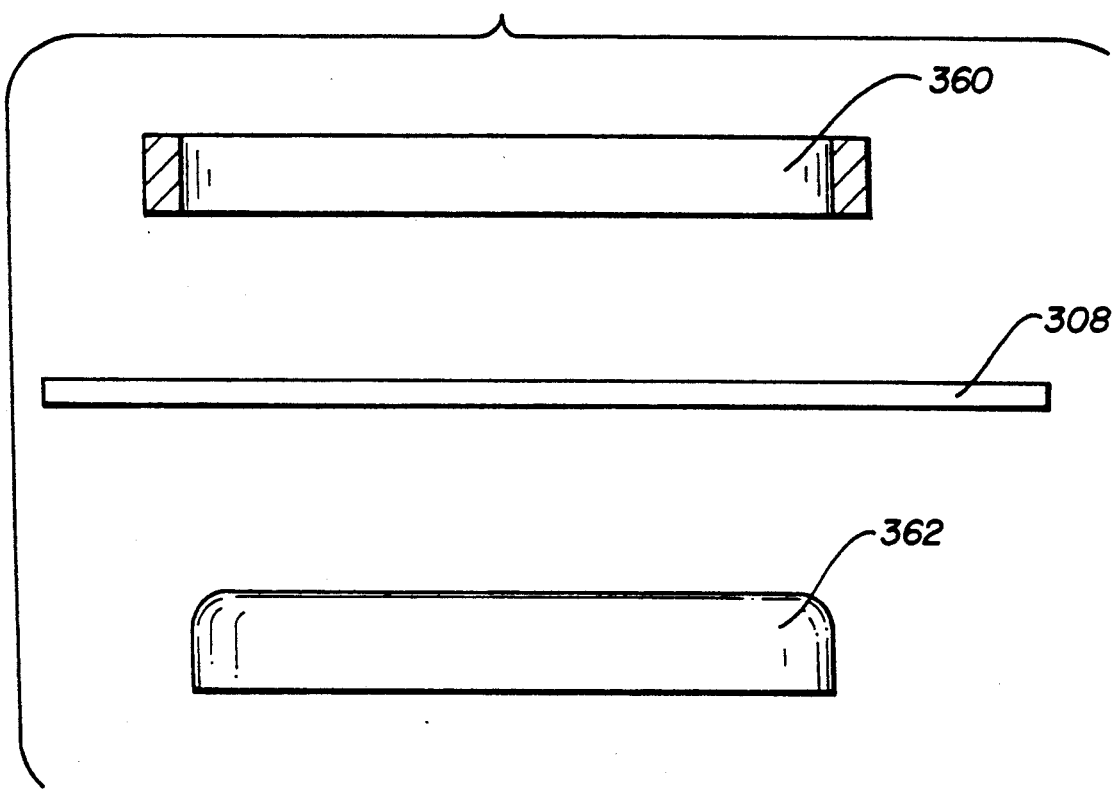
FIG. 18 is a cross-sectional view of the substrate and mold for forming the substrate for the panel of the above-referenced invention.
Figure 19:
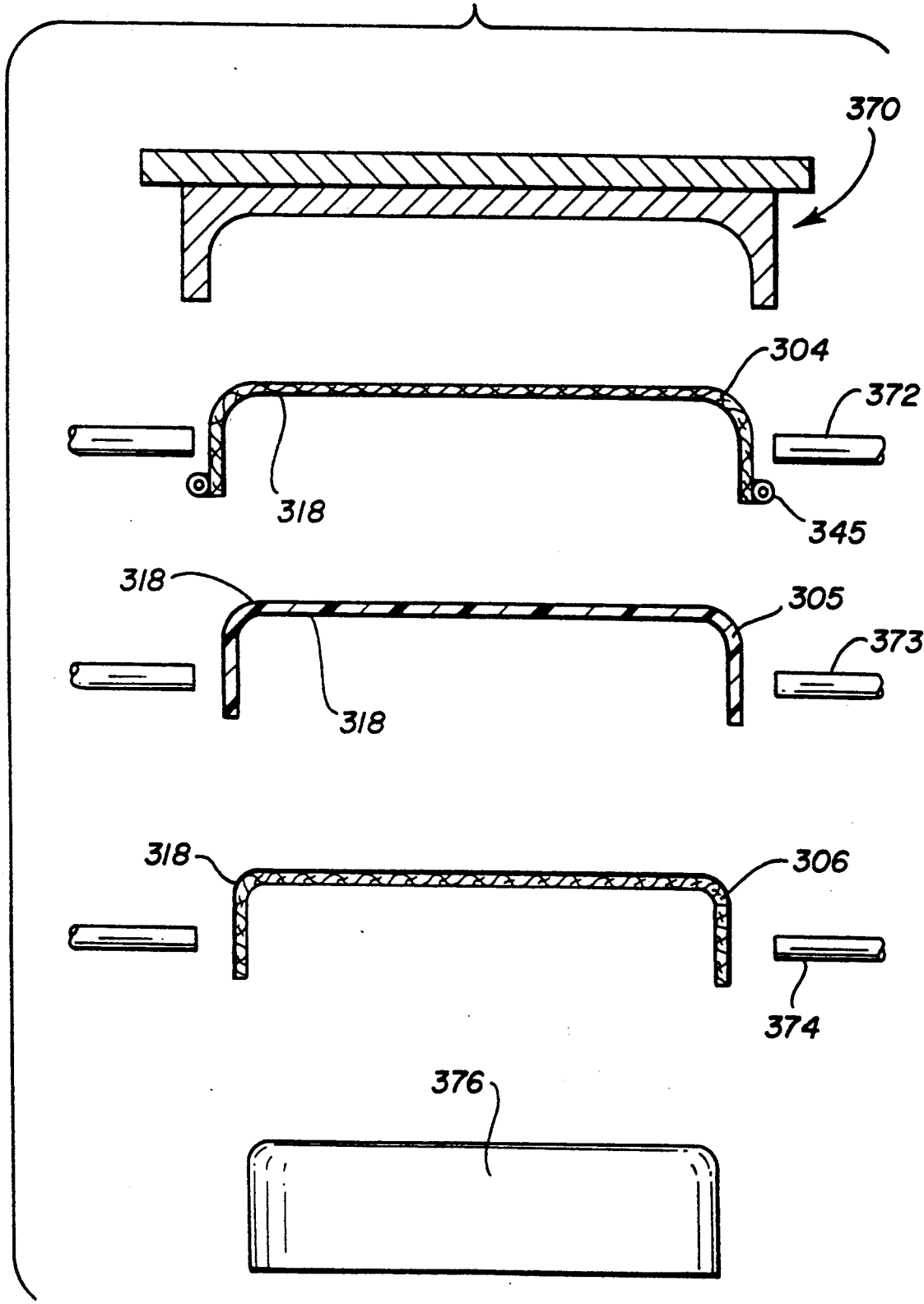
FIG. 19 shows the components of the formed panel of the present invention and the mold for pressing the components together to form the panel of the present invention.

As shown in FIG. 18, the sized substrate 308 is formed into a formed substrate 305 in a similar manner as the outer and inner formed fabrics 304 and 306. Initially, the sized substrate is formed into substrate sections 308. The substrate is typically of a rigid construction comprised of polypropolyne, ABS, styrene, PVC or any other substance known in the art or any combination thereof. The substrate is formed by a molding having an open framed female mold 360 and a male mold 362. The actual molding of the sized substrate 308 can be by vacuum molding or any other method of molding known in the art.

Upon forming the formed substrate 305, any excess substrate around the edge thereof can be trimmed from the formed substrate 308. Next, a contact adhesive 318 is applied to both surfaces of the formed substrate 308.

Upon forming the outer formed fabric 304 with welting 345, the formed substrate 305 and the inner formed fabric 306, the components are arranged within a mold having a female compression mold 370 and a male compression mold 376. The components are positioned sequentially and held in place by outer formed fabric clamps 372, formed substrate clamps 373, and inner formed fabric clamps 374 respectively. Typically the clamps 372, 373 and 374 are vacuum clamps and positioned on all four sides of each of the components. The female and male components of the mold 370 and 376 respectively may be of relatively inexpensive construction. For example, an epoxy or aluminum female mold may be employed with a neoprene rubber or other such male mold.

After the components of the formed panel are in position, the mold components 372 and 376 close to press the components 304, 305, and 306 together to form the formed panel. The adhesive 318 on the underside of outer formed fabric 304, on both sides of formed substrate 305 and on the top side of the inner formed fabric 306 are contacted and pressed together by female and male mold components 370 and 376. The adhesive 318 is typically a contact adhesive and under pressure forms a bond between the components of the formed panel so that the components of the formed panel are firmly laminated together.

The formed panel produced in accordance with this embodiment of the invention results in a rigid formed panel having a soft fabric outer and inner surface.

The formed panel produced in accordance with this embodiment of the present invention provides inner and outer fabric outer and inner surfaces that have reduced wrinkles and stretching formed in the manufacturing process. This benefit is obtained by separately forming the components of the formed panel particularly the inner and outer formed fabrics in spring loaded molds prior to adhering the components to each other. Additionally, by forming the components separately, waste resulting from a defect in one of the components is confined to that component. As such, an entire laminated panel need not be discarded, but just the component with the defect. Additionally, producing the components separately allows for notches to be formed on the inner fabric for forming compartments in the luggage interior, with the need for forming such notches on the outer fabric on the substrate. Such notches can be reinforced by a rigid material to give the structure strength.

Having thus described my invention in detail, it is to be understood that the foregoing description is not intended to limit the spirit and scope thereof. What is desired to be protected by Letters Patent is set forth in the appended claims.

What is claimed is:

1. A method of manufacturing a formed panel for luggage comprising the steps of:

providing a sized fabric with adhesive on one side thereof;

heating the adhesive to provide flexibility to the sized fabric;

molding the sized fabric to form an outer formed fabric;

providing a second sized fabric with an adhesive on one side thereof;

heating the adhesive to provide flexibility to the second sized fabric;

molding the second sized fabric to form an inner formed fabric;

providing a sized substrate;

molding the sized substrate to a formed substrate;

applying adhesive to both surfaces of the formed substrate;

stacking the outer formed fabric, the formed substrate and the inner formed fabric; and compressing the outer formed fabric, the formed substrate and the inner formed fabric together so that the surfaces containing adhesive contact and coact to laminate the outer formed fabric, the formed substrate and the inner formed fabric together to form a formed panel.

2. The method of claim 1 wherein the step of providing the first sized fabric comprises the steps of:
removing a fabric from a roll;
applying adhesive to the fabric;
drying the adhesive onto the fabric; and
cutting the fabric into sized pieces.

3. The method of claim 2 further including, after the step of forming the outer formed fabric, the step of cutting away the excess material from the edge of the outer formed fabric.

4. The method of claim 3, further including, after the step of forming the inner formed fabric, the step of cutting the excess material from the edge of the inner formed fabric.

5. The method of claim 4 further including, after the step of molding the sized substrate to a formed substrate, the step of cutting the excess material from the edge of the formed substrate.

6. The method of claim 5 further including, the step of forming notches on the inner fabric for forming compartments within the luggage.

7. The method of claim 6 further including the step of inserting a stiffening material into the notches to form solid compartments within the luggage.

8. The method of claim 6 further including, during the step of forming the outer formed fabric, the step of forming ridges on the outer formed fabric.

9. The method of claim 6 further including, during the step of forming the inner formed fabric, the step of forming ridges on the inner formed fabric.

10. The method of claim 7 further including, during the step of forming the substrate, the step of forming ridges on the substrate.

11. The method of claim 3 wherein the step of providing the second sized fabric comprises the steps of:
removing a fabric from a roll;
applying adhesive to the fabric;
drying the adhesive onto the fabric; and
cutting the fabric into sized pieces.

* * * * *